US012570579B2

(12) United States Patent
Matsui et al.

(10) Patent No.: US 12,570,579 B2
(45) Date of Patent: Mar. 10, 2026

(54) SINTERED BODY AND METHOD FOR PRODUCING THE SAME

(71) Applicant: TOSOH CORPORATION, Yamaguchi (JP)

(72) Inventors: Koji Matsui, Yamaguchi (JP); Kohei Hosoi, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 705 days.

(21) Appl. No.: 17/919,379

(22) PCT Filed: Apr. 20, 2021

(86) PCT No.: PCT/JP2021/015952
§ 371 (c)(1),
(2) Date: Oct. 17, 2022

(87) PCT Pub. No.: WO2021/215419
PCT Pub. Date: Oct. 28, 2021

(65) Prior Publication Data
US 2023/0167028 A1      Jun. 1, 2023

(30) Foreign Application Priority Data

Apr. 22, 2020      (JP) ................................. 2020-075780
Oct. 26, 2020      (JP) ................................. 2020-178571

(51) Int. Cl.
C04B 35/488          (2006.01)
C04B 35/645          (2006.01)

(52) U.S. Cl.
CPC ...... C04B 35/4885 (2013.01); C04B 35/6455 (2013.01); C04B 2235/3206 (2013.01); C04B 2235/3217 (2013.01); C04B 2235/3225 (2013.01); C04B 2235/3229 (2013.01); C04B 2235/3246 (2013.01); C04B 2235/3287 (2013.01); C04B 2235/3418 (2013.01); C04B 2235/5409 (2013.01); C04B 2235/762 (2013.01); C04B 2235/765 (2013.01); C04B 2235/77 (2013.01); C04B 2235/781 (2013.01); C04B 2235/9653 (2013.01)

(58) Field of Classification Search
CPC ............ C04B 35/4885; C04B 35/6455; C04B 2235/3206; C04B 2235/3217; C04B 2235/3225; C04B 2235/3229; C04B 2235/3246; C04B 2235/3287; C04B 2235/3418; C04B 2235/5409; C04B 2235/762; C04B 2235/765; C04B 2235/77; C04B 2235/781; C04B 2235/9653
See application file for complete search history.

(56) References Cited

U.S. PATENT DOCUMENTS

| | | | |
|---|---|---|---|
| 5,525,560 A | 6/1996 | Yamazaki et al. | |
| 2004/0192535 A1* | 9/2004 | Tanaka | C01G 25/02 501/103 |
| 2005/0272591 A1* | 12/2005 | Nawa | C04B 35/119 264/661 |
| 2008/0275568 A1* | 11/2008 | Shikata | A61L 27/427 623/18.11 |
| 2016/0368826 A1* | 12/2016 | Calado Da Silva | C04B 35/486 |
| 2017/0362129 A1 | 12/2017 | Hirota et al. | |

FOREIGN PATENT DOCUMENTS

| | | | |
|---|---|---|---|
| CN | 106170465 A | 11/2016 | |
| EP | 3 960 721 A1 | 3/2022 | |
| JP | 2003192452 A * | 7/2003 | |
| JP | 2003306378 A * | 10/2003 | |
| JP | 2004-262694 A | 9/2004 | |
| JP | 2005-306726 A | 11/2005 | |
| JP | 2011-73907 A | 4/2011 | |
| JP | 2011073907 A * | 4/2011 | |
| JP | 2011-178610 A | 9/2011 | |
| JP | 2017-226555 A | 12/2017 | |
| WO | 2005/042047 A1 | 5/2005 | |
| WO | WO-2020217942 A1 * | 10/2020 | C04B 35/64 |

OTHER PUBLICATIONS

International Search Report, Written Opinion of the International Searching Authority issued in International Patent Application No. PCT/JP2021/015952, dated Jun. 22, 2021, along with an English translation thereof.
International Preliminary Report on Patentability issued in International Patent Application No. PCT/JP2021/015952, dated Oct. 25, 2022, along with an English translation thereof.
Supplementary European Search Report dated Apr. 23, 2024 in corresponding European family member application No. 21793287.0.

* cited by examiner

*Primary Examiner* — James C Goloboy
(74) *Attorney, Agent, or Firm* — GREENBLUM & BERNSTEIN, P.L.C.

(57) ABSTRACT

A sintered body including zirconia containing a stabilizer, wherein the sintered body has a monoclinic fraction of 0.5% or more and has a three-point bending strength of more than 1450 MPa as measured by a three-point bending test according to JIS R 1601.

15 Claims, No Drawings

SINTERED BODY AND METHOD FOR PRODUCING THE SAME

TECHNICAL FIELD

The present disclosure relates to a sintered body containing zirconia as a main phase and a method for producing the sintered body.

BACKGROUND ART

Zirconia sintered bodies are being considered for decorative applications, such as decorative parts for watches, portable electronic devices, automobiles, home appliances and the like, in addition to conventional applications that require strength, such as grinding media and structural materials.

Sintered bodies to be used for decorative applications are required to have reduced brittleness, that is, an increased fracture toughness value.

Various zirconia sintered bodies have been reported for the purpose of improving the fracture toughness value. For example, Patent Literature 1 reports a zirconia-alumina complex sintered body formed by mixing a commercial 3% by mole yttria-containing zirconia powder produced by a neutralization coprecipitation method with a commercial alumina powder to prepare a mixed powder and then performing microwave sintering of the mixed powder. The fracture toughness value ($K_{IC}$) of the complex sintered body measured by an IF method is said to be in the range of 6.02 to 6.90 MPa·m$^{1/2}$.

Patent Literature 2 reports a zirconia sintered body formed by hot isostatic pressing (HIP) of a zirconia powder containing phosphorus, silicon dioxide and alumina. The sintered body is reported to have a fracture toughness value in the range of 6 to 11 MPa·m$^{1/2}$ as measured by a method specified in JIS R 1607.

CITATION LIST

Patent Literature

PTL 1: Japanese Unexamined Patent Application Publication No. 2017-226555
PTL 2: Japanese Unexamined Patent Application Publication No. 2011-178610

SUMMARY OF INVENTION

Technical Problem

For application to decorative parts, it is also required to evaluate the brittleness of a sintered body using a highly reliable fracture toughness value. However, there are a plurality of standardized methods for measuring fracture toughness, and these measurement methods give greatly different values. The fracture toughness values in Patent Literature 1 are measured by a simplified method, and the fracture toughness values in Patent Literature 2 are measured by an unclear method. Thus, these disclosed values are unreliable.

It is an object of the present disclosure to provide at least one of a zirconia sintered body with a high fracture toughness value measured by an SEPB method and with high mechanical strength, a method for producing the zirconia sintered body, and a zirconia sintered body with a higher fracture toughness value than known yttria-containing zirconia sintered bodies containing 2.0% or less by mole of yttria.

Solution to Problem

The present invention is defined in the claims, and the gist of the present disclosure is as follows:

[1] A sintered body comprising zirconia containing a stabilizer, wherein the sintered body has a monoclinic fraction of 0.5% or more and has a three-point bending strength of more than 1450 MPa as measured by a three-point bending test according to JIS R 1601.

[2] The sintered body according to [1], wherein a total light transmittance of light with a wavelength of 600 nm is 20% or more at a sample thickness of 1.0 mm.

[3] The sintered body according to [1] or [2], wherein a ratio of an integrated intensity of an XRD peak corresponding to a (11-1) plane of monoclinic zirconia to an integrated intensity of an XRD peak corresponding to a (111) plane of the monoclinic zirconia is 0 or more.

[4] The sintered body according to any one of [1] to [3], wherein the stabilizer is at least one selected from the group consisting of yttria, calcia, magnesia and ceria.

[5] The sintered body according to any one of [1] to [4], wherein a stabilizer content is 1.0% or more by mole and less than 2.5% by mole.

[6] The sintered body according to any one of [1] to [4], wherein a stabilizer content is 1.0% or more by mole and less than 1.9% by mole.

[7] The sintered body according to any one of [1] to [6], wherein a fracture toughness value measured by a method conforming to an SEPB method specified in JIS R 1607 is 6 MPa·m$^{0.5}$ or more and 11 MPa·m$^{0.5}$ or less.

[8] The sintered body according to any one of [1] to [7], wherein a tetragonal zirconia (113) plane has a shift value of 0.15 degrees or more.

[9] The sintered body according to any one of [1] to [8], wherein at least one additive component selected from the group consisting of alumina, germania and silica.

[10] The sintered body according to any one of [1] to [9], wherein the additive component is alumina.

[11] The sintered body according to any one of [1] to [10], wherein the zirconia contains monoclinic zirconia and at least one of tetragonal zirconia and cubic zirconia.

[12] The sintered body according to any one of [1] to [11], wherein a ratio of a tetragonal fraction after immersion treatment in hot water at 140° C. for 6 hours to a tetragonal fraction before the immersion treatment in hot water at 140° C. for 6 hours is 15% or more.

[13] A method for producing the sintered body according to any one of [1] to [12], comprising the step of sintering a powder that contains a stabilizer and zirconia with a monoclinic fraction of more than 70% and in which monoclinic zirconia has a crystallite size of more than 23 nm and 80 nm or less to form a presintered body with a relative density of 99% or less, and pressure-sintering the presintered body.

[14] The production method according to [13], wherein the pressure treatment is hot isostatic pressing treatment.

[15] A member comprising the sintered body according to any one of [1] to [12].

Advantageous Effects of Invention

The present disclosure can provide at least one of a zirconia sintered body with a high fracture toughness value measured by the SEPB method and with high mechanical strength, a method for producing the zirconia sintered body, and a zirconia sintered body with a higher fracture toughness value than known yttria-containing zirconia sintered bodies containing 2.0% or less by mole of yttria.

DESCRIPTION OF EMBODIMENTS

The present disclosure is described in the following embodiments.

The terms used in the present embodiments are described below.

The terms "monoclinic fraction" and "tetragonal fraction" refer to the proportions of monoclinic zirconia and tetragonal zirconia, respectively, in the crystalline phase of zirconia. The term "monoclinic intensity ratio" refers to the ratio of the integrated intensity of an XRD peak corresponding to a (11-1) plane of monoclinic zirconia to the integrated intensity of an XRD peak corresponding to a (111) plane of the monoclinic zirconia in the crystalline phase of zirconia.

For a powder, a powder X-ray diffraction (hereinafter also referred to as "XRD") pattern of the powder is used. For a sintered body, an XRD pattern of a surface of the sintered body after mirror polishing (hereinafter also referred to as a "mirror-surface sintered body") is used. The monoclinic fraction can be determined using the following formula (1). The tetragonal fraction can be determined using the following formula (2). The monoclinic intensity ratio can be determined using the following formula (3).

$$f_m = \{I_m(111) + I_m(11\text{-}1)\} / [I_m(111) + I_m(11\text{-}1) + I_t(111) + I_c(111)] \times 100 \quad (1)$$

$$f_t = I_t(111) / [I_m(111) + I_m(11\text{-}1) + I_t(111) + I_c(111)] \times 100 \quad (2)$$

$$M_{(11\text{-}1)/(111)} = \{I_m(11\text{-}1) / I_m(111)\} \quad (3)$$

In the formulae (1) to (3), $f_m$ denotes the monoclinic fraction (%), $f_t$ denotes the tetragonal fraction (%), $M_{(11\text{-}1)/(111)}$ denotes the monoclinic intensity ratio, $I_m(111)$ and $I_m(11\text{-}1)$ denote the integrated intensities of XRD peaks corresponding to the (111) and (11-1) planes of monoclinic zirconia, respectively, $I_t(111)$ denotes the integrated intensity of an XRD peak corresponding to the (111) plane of tetragonal zirconia, and $I_c(111)$ denotes the integrated intensity of an XRD peak corresponding to the (111) plane of cubic zirconia.

XRD patterns can be measured under the following conditions.

Radiation source: CuKα radiation ($\lambda$=0.15418 nm)

Measurement mode: continuous scanning

Scanning speed: 4 degrees/min

Step width: 0.02 degrees

Measurement range: 2θ=26 to 33 degrees

In the XRD pattern measurement, an XRD peak corresponding to each crystal plane of zirconia is preferably measured as a peak with a peak top at the following 2θ.

XRD peak corresponding to (111) plane of monoclinic zirconia: 2θ=31±0.5 degrees

XRD peak corresponding to (11-1) plane of monoclinic zirconia: 2θ=28±0.5 degrees RD peaks corresponding to the (111) plane of tetragonal zirconia and cubic zirconia overlap, and the 2θ of each peak top is 2θ=30±0.5 degrees.

The integrated intensity of an XRD peak of each crystal plane can be determined after the XRD peaks are separated by a method described in H. Toraya, J. Appl. Crystallogr., 19, 440-447 (1986) using "PRO-FIT" as a calculation program.

The "mirror-surface sintered body" subjected to the XRD measurement is a sintered body with a surface roughness Ra of 0.04 µm or less formed by scraping the surface after sintering with a surface grinding machine and then by mirror-polishing a surface to be measured in the following order: automatic polishing with a coated abrasive, automatic polishing with diamond slurry with an average particle size of 3 µm, and automatic polishing with 0.03-µm colloidal silica.

The term "crystallite size of monoclinic zirconia" (hereinafter also referred to as "Dm") in a powder refers to a value determined from an XRD pattern of a powder using the following formula (4). The term "crystallite size of tetragonal zirconia" (hereinafter also referred to as "Dt") refers to a value determined from an XRD pattern of a powder using the following formula (5).

$$D_m = \kappa \lambda / (\beta \cos \theta_m) \quad (4)$$

$$D_t = \kappa \lambda / (\beta \cos \theta_t) \quad (5)$$

In the formulae (4) and (5), $D_m$ denotes the crystallite size (nm) of monoclinic zirconia, $D_t$ denotes the crystallite size (nm) of tetragonal zirconia, κ denotes the Scherer constant (κ=1), λ denotes the wavelength (nm) of a light source used for XRD measurement, β denotes the half-width (degrees) after correction of after correction of instrumental broadening using quartz sand (manufactured by Wako Pure Chemical Industries, Ltd.) with a particle size in the range of 25 to 90 µm, $\theta_m$ denotes the Bragg angle (degrees) of reflection corresponding to the (11-1) plane of monoclinic zirconia in XRD measurement, and $\theta_t$ denotes the Bragg angle (degrees) of reflection corresponding to the (111) plane of tetragonal zirconia in XRD measurement. When CuKα radiation is used as a light source for XRD measurement, λ is 0.15418 nm.

The term "BET specific surface area" refers to a value measured by a BET one-point method using nitrogen ($N_2$) as an adsorption material in accordance with JIS R 1626-1996.

The term "particle size based on volume distribution" refers to the particle size of a powder determined in volumetric particle size distribution measurement by a laser diffraction method. The particle size determined by the laser diffraction method is a size determined by non-spherical approximation. The volumetric particle size distribution may be measured under the following conditions.

Sample: powder slurry

Refractive index of zirconia: 2.17

Refractive index of solvent (water): 1.333

Measurement time: 30 seconds

Pretreatment: ultrasonic dispersion treatment

The term "median size" refers to a particle size corresponding to 50% by volume in a cumulative volumetric particle size distribution curve determined in the volumetric particle size distribution measurement by the laser diffraction method.

The term "particle size distribution curve" refers to a particle size distribution curve of a powder determined in the volumetric particle size distribution measurement by the laser diffraction method.

The term "fracture toughness value" refers to a fracture toughness value ($MPa \cdot m^{0.5}$) measured by a method conforming to the SEPB method specified in JIS R 1607. The fracture toughness value may be measured at a span of 30 mm using a columnar sintered body sample 4 mm in width and 3 mm in thickness. The fracture toughness value of a sintered body according to the present embodiment may be the average value of 10 measurements. JIS R 1607 specifies two methods for measuring fracture toughness: the IF method and the SEPB method. The IF method tends to give a larger measured value than the SEPB method. Furthermore, the IF method is a simplified measurement method and has large variations in measured values. Thus, absolute fracture toughness values in the present embodiment cannot be compared with absolute fracture toughness values measured by the IF method. Likewise, absolute fracture toughness values measured by methods other than the SEPB method cannot be compared with absolute fracture toughness values measured by the SEPB method.

The term "bending strength" refers to three-point bending strength determined in a three-point bending test according to JIS R 1601. The bending strength may be measured at a span of 30 mm using a columnar sintered body sample 4 mm in width and 3 mm in thickness. The bending strength of the sintered body according to the present embodiment may be the average value of 10 measurements.

The term "total light transmittance" refers to the total light transmittance of light with a wavelength of 600 nm at a sample thickness of 1.0 mm and can be measured by a method according to JIS K 7361. It can be determined as a total transmittance of diffuse transmittance and linear transmittance of incident light with a wavelength of 600 nm. A sample with a thickness of 1 mm and a surface roughness (Ra) of 0.04 μm or less, preferably 0.02 μm or less, on both surfaces (the measurement surface and the opposite surface) may be used as a measurement sample. The sample may be irradiated with light with a wavelength of 600 nm using a typical spectrophotometer (for example, V-650, manufactured by JASCO Corporation). Transmitted light may be focused with an integrating sphere to measure the transmittance (diffuse transmittance and linear transmittance) of light through the sample as the total light transmittance. The total light transmittance may be measured under the following conditions.

Bandwidth: 5.0 nm

Data acquisition interval: 0.5 nm

Scanning speed: 1000 nm/min

The term "relative density" refers to the ratio (%) of the measured density to the theoretical density. The measured density of a green body is the ratio ($g/cm^3$) of the mass determined by mass measurement to the volume determined by dimensional measurement. The measured density of a sintered body is the ratio ($g/cm^3$) of the mass determined by mass measurement to the volume determined by Archimedes' principle. The theoretical density is the density ($g/cm^3$) determined using the following formulae (6) to (9):

$$A = 0.5080 + 0.06980X/(100+X) \qquad (6)$$

$$C = 0.5195 - 0.06180X/(100+X) \qquad (7)$$

$$\rho_z = [124.25(100-X) + 225.81X]/[150.5(100+X)A^2C] \qquad (8)$$

$$\rho_0 = 100/[(Y_A/3.987) + (Y_G/3.637) + (Y_S/2.2) + (100-Y_A-Y_G-Y_S)/\rho_z] \qquad (9)$$

In the formulae (6) to (9), po denotes the theoretical density, $\rho_z$ denotes the theoretical density of zirconia, A and C denote constants, X denotes the mole ratio (% by mole) of a stabilizer (for example, yttria ($Y_2O_3$)) to the total of zirconia ($ZrO_2$) and the stabilizer (for example, yttria), and $Y_A$, $Y_G$ and $Y_S$ denote the mass ratios (% by mass) of alumina in terms of $Al_2O_3$, germania in terms of $GeO_2$ and silica in terms of $SiO_2$ to the total of zirconia in terms of $ZrO_2$, the stabilizer (for example, yttria) on an oxide basis (for example, in terms of $Y_2O_3$), alumina in terms of $Al_2O_3$, germania in terms of $GeO_2$ and silica in terms of $SiO_2$, respectively, of a green body or a sintered body.

The sintered body according to the present embodiment is described below.

The sintered body according to the present embodiment contains zirconia containing a stabilizer and has a monoclinic fraction of 0.5% or more. In particular, the sintered body according to the present embodiment contains zirconia containing a stabilizer, has a monoclinic fraction of 0.5% or more, and has a three-point bending strength of more than 1450 MPa as measured by a three-point bending test according to JIS R 1601.

The sintered body according to the present embodiment is a sintered body comprising zirconia containing a stabilizer, and is a sintered body comprising zirconia containing a stabilizer as a main phase, that is, a so-called zirconia sintered body.

The stabilizer is a component with the function of stabilizing zirconia, may be at least one selected from the group consisting of calcia (CaO), magnesia (MgO), ceria ($CeO_2$) and yttria ($Y_2O_3$), and is preferably at least one of ceria and yttria, more preferably yttria. In the sintered body according to the present embodiment, the stabilizer content is any content sufficient to partially stabilize zirconia. For example, when the stabilizer is yttria, the stabilizer content may be, as the mole ratio of yttria to the sum of zirconia ($ZrO_2$) and yttria ($Y_2O_3$) in the sintered body ($=\{Y_2O_3/(ZrO_2+Y_2O_3)\} \times 100$ [mol %]; hereinafter also referred to as the "yttria content"), 1.0% or more by mole and 2.5% or less by mole, 1.1% or more by mole and 2.2% or less by mole, 1.1% or more by mole and 2.0% or less by mole, preferably 1.2% or more by mole and less than 2.0% by mole, more preferably 1.2% or more by mole and 1.8% or less by mole. A stabilizer content in such a range tends to result in a high fracture toughness value measured by the SEPB method. The yttria content is preferably 1.4% or more by mole and 2.1% or less by mole, more preferably 1.5% or more by mole and 1.8% or less by mole. Furthermore, the yttria content may be 1.0% or more by mole, 1.3% or more by mole or 1.6% or more by mole, and 2.3% or less by mole, less than 1.9% by mole, 1.8% or less by mole or 1.7% or less by mole.

The stabilizer is preferably dissolved in zirconia. The sintered body according to the present embodiment preferably contains no undissolved stabilizer, and the stabilizer is preferably entirely dissolved in zirconia. More preferably, an XRD pattern of the sintered body according to the present embodiment does not have an XRD peak of the stabilizer. In the present embodiment, an XRD peak of the stabilizer observed as an XRD peak different from the XRD peaks of zirconia can be considered to indicate an undissolved stabilizer. Another embodiment of the sintered body of the present embodiment may include an embodiment containing an undissolved stabilizer to such an extent that no XRD peak of the stabilizer can be observed.

The sintered body according to the present embodiment may contain at least one additive component selected from the group consisting of alumina ($Al_2O_3$), germania ($GeO_2$) and silica ($SiO_2$). The additive component is preferably at least one of alumina and germania, more preferably alumina. Even at a low stabilizer content of zirconia, the additive component tends to increase the grain boundary strength between crystal grains. When containing the additive component, the sintered body according to the present embodiment is a sintered body that contains the additive component and the remainder composed of zirconia containing a stabilizer. The additive component content (when the additive component is alumina or the like, it is also referred to as the "alumina content" or the like) is the ratio of the mass of the additive component to the total mass of the stabilizer, such as zirconia or yttria, and the additive component of the sintered body. For example, the alumina content of a sintered body containing alumina as an additive component and yttria-containing zirconia as the remainder can be determined from $(\{Al_2O_3/(ZrO_2+Y_2O_3+Al_2O_3)\}\times100[\%$ by mass]). The additive component content may be 0.05% or more by mass and 30% or less by mass, preferably more than 0.1% by mass and 25% or less by mass, more preferably 0.2% or more by mass and 20% or less by mass. An additive component content of 0.02% or more by mass and 0.3% or less by mass tends to result in high mechanical strength and less transformation to monoclinic zirconia. A preferred additive component content may be 0% or more by mass, more than 0% by mass, 0.02% or more by mass, 0.1% or more by mass or 0.3% or more by mass, and 25% or less by mass, 21% or less by mass, 11% or less by mass, 6% or less by mass, 2% or less by mass or 1% or less by mass.

The sintered body according to the present embodiment preferably contain no impurities other than incidental impurities. The incidental impurities may include hafnia ($HfO_2$). In the calculation of values related to the composition, such as the theoretical density, the stabilizer content and the additive component content, in the present embodiment, an incidental impurity hafnia ($HfO_2$) may be regarded as zirconia ($ZrO_2$).

The sintered body according to the present embodiment has a monoclinic fraction of 0.5% or more, preferably 0.5% or more and 15% or less, more preferably 0.8% or more and 12% or less. Because the fracture toughness tends to be high, the monoclinic fraction is preferably 1% or more and 15% or less, 2% or more and 14% or less, 5% or more and 12% or less, or 7% or more and 11% or less. Because the bending strength tends to be high, the monoclinic fraction is preferably 0.5% or more and 5% or less, more preferably 0.8% or more and 3% or less.

An as-sintered-surface (hereinafter also referred to as a "sintered surface") of a sintered body immediately after sintering is rough and contains many fracture origins, such as irregularities. The sintered surface is, for example, a surface with an Ra of more than 0.04 μm and, from another perspective, a surface without polishing marks. To prevent a sintered body from being broken, before evaluation or use for various applications, the sintered body is processed by grinding or the like to remove the sintered surface and is polished. Thus, the sintered body has an exposed polished-surface (hereinafter also referred to as a "mirror surface"). The mirror surface may be a smooth surface and may be a surface with Ra of 0.04 μm or less. The monoclinic fraction is a value on a mirror surface of a sintered body, that is, a value on a surface of a mirror-surface sintered body. The crystalline phase of a known sintered body containing a partially stabilized zirconia as a main phase is composed of at least one of tetragonal zirconia and cubic zirconia after processing or mirror finishing, such as polishing. Thus, a known mirror-surface sintered body contains substantially no or little monoclinic zirconia. On the other hand, a sintered body with poor mechanical characteristics may be broken during mirror finishing and even may not be processed into a sample for the measurement of the monoclinic fraction. In contrast, the sintered body according to the present embodiment can be processed into a mirror-surface sintered body, and the monoclinic fraction on the mirror surface can be measured. Furthermore, the mirror surface has monoclinic zirconia satisfying the monoclinic fraction described above. Thus, the sintered body according to the present embodiment is considered to be a sintered body containing monoclinic zirconia in the whole sintered body or a sintered body containing tetragonal zirconia that is easily transformed into monoclinic zirconia, and is considered to be different from a known sintered body containing monoclinic zirconia only on a surface to be processed.

In the sintered body according to the present embodiment, the zirconia contains monoclinic zirconia and at least one of tetragonal zirconia and cubic zirconia and is preferably composed of monoclinic zirconia and tetragonal zirconia.

The monoclinic zirconia in the sintered body according to the present embodiment is monoclinic zirconia with an XRD peak corresponding to at least a monoclinic zirconia (111) plane in its XRD pattern. Such monoclinic zirconia contained in the state before degradation treatment tends to provide a sintered body with a high fracture toughness value. In addition, the sintered body tends to be resistant to hydrothermal degradation. When monoclinic zirconia is formed by degradation of the sintered body, an XRD peak corresponding mainly to the monoclinic zirconia (11-1) plane in an XRD pattern has high intensity. On the other hand, the monoclinic zirconia in the sintered body according to the present embodiment preferably has an XRD peak corresponding to at least the monoclinic zirconia (111) plane in its XRD pattern, and the monoclinic intensity ratio thereof is preferably 0 or more, 0.3 or more, 0.4 or more or 0.5 or more. The monoclinic intensity ratio is preferably 10 or less, 8 or less, 5 or less, 3 or less or 1.5 or less and may be 1.2 or less or 1.0 or less. In the present embodiment, the monoclinic intensity ratio can be determined using the formula (3). Thus, in a sintered body in which the $I_m(111)$ is zero, that is, in a sintered body without an XRD peak corresponding to the monoclinic zirconia (111) plane, the monoclinic intensity ratio is infinite and cannot be determined. In other words, the sintered body according to the present embodiment preferably does not include a sintered body with an infinite monoclinic intensity ratio.

The average grain size of zirconia crystal grains in the sintered body according to the present embodiment varies with the sintering temperature and is, for example, 0.1 μm or more and 0.8 μm or less, 0.15 μm or more and 0.60 μm or less, 0.20 μm or more and 0.55 μm or less or 0.25 μm or more and 0.45 μm or less. In the present embodiment, for a sintered body with a particularly high bending strength, the average grain size may be 0.40 μm or more or 0.50 μm or more and 0.65 μm or less or 0.60 μm or less.

The sintered body according to the present embodiment may have a relative density (hereinafter also referred to as a "sintered body density") of 98% or more and 100% or less, 98.4% or more and 100% or less, 99% or more and 100% or less, 99.5% or more and 100% or less or 99.7% or more and 100% or less.

Furthermore, the sintered body according to the present embodiment is preferably a sintered body formed by pressure sintering, more preferably a sintered body formed by hot isostatic pressing (hereinafter also referred to as "HIP") (a so-called HIP-treated body). The HIP-treated body may be a body treated by another sintering method after pressure sintering, for example, a body subjected to sintering in an oxidizing atmosphere after HIP treatment, such as pressure-less sintering after pressure sintering.

In the sintered body according to the present embodiment, the shift value of the tetragonal zirconia (113) plane (hereinafter also referred to simply as the "shift value") is preferably 0.15 degrees or more, 0.3 degrees or more or 0.6 degrees or more. The shift value may be 2.0 degrees or less, 1.5 degrees or less or 1.0 degrees or less.

The shift value is the difference in 2θ on the tetragonal zirconia (113) plane between the tilt angles ψ=0 degrees and ψ=45 degrees, particularly the difference in 2θ on the tetragonal zirconia (113) plane between the tilt angles ψ=0 degrees and ψ=45 degrees measured by powder X-ray diffractometry using CrKα radiation as a radiation source. To determine the shift value in the present embodiment, the conditions for powder X-ray diffractometry are as follows:

Radiation source: CrKα radiation (λ=2.29100 nm)
Accelerating voltage: 30 kV
Electric current: 30 mA
Measurement method: iso-inclination method
Collimator size: 4 mm in diameter
Measurement lattice plane: tetragonal zirconia (113) plane
Tilt angle ψ: 0 degrees and 45 degrees Such powder X-ray diffractometry can be performed with a typical apparatus (for example, Auto MATE, manufactured by Rigaku Corporation).

In this measurement, a peak corresponding to the tetragonal zirconia (113) plane is observed as a peak with a peak top at 2θ=152±2.0 degrees. The shift value is a value determined using the following formula from the difference between 2θ of a peak top corresponding to the tetragonal zirconia (113) plane at the tilt angle ψ=0 degrees (hereinafter also referred to as "$2\theta_{(0\ degrees)}$") and 2θ of the peak top corresponding to the tetragonal zirconia (113) plane at the tilt angle ψ=45 degrees (hereinafter also referred to as "$2\theta_{(45\ degrees)}$").

$$\text{Shift value (degree)} = 2\theta_{(45\ degrees)} - 2\theta_{(0\ degrees)}$$

It is thought that a crystalline state with such a shift value is more likely to cause stress between crystal grains than known sintered bodies. Thus, it is thought that the sintered body according to the present embodiment has a higher fracture toughness value, and, for example, a sintered body containing yttria as a stabilizer can be formed as a sintered body with less defects and a higher fracture toughness value even with a low yttria content of 2.0% or less by mole, less than 1.9% by mole, 1.8% or less by mole or 1.7% or less by mole.

The sintered body according to the present embodiment may have a fracture toughness value (a fracture toughness value measured by a method conforming to the SEPB method specified in JIS R 1607) of 6 MPa·m$^{0.5}$ or more and 11 MPa·m$^{0.5}$ or less, preferably 6.2 MPa·m$^{0.5}$ or more, more preferably 7 MPa·m$^{0.5}$ or more, still more preferably 7.2 MPa·m$^{0.5}$ or more, still more preferably 8 MPa·m$^{0.5}$ or more, particularly preferably 8.5 MPa·m$^{0.5}$ or more. The fracture toughness value is preferably high but may be, for example, 11 MPa·m$^{0.5}$ or less, 10.5 MPa·m$^{0.5}$ or less, 9.5 MPa·m$^{0.5}$ or less, 9 MPa·m$^{0.5}$ or less or 8.8 MPa·m$^{0.5}$ or less. Having such a fracture toughness value, a sintered body with a thickness of, for example, 1 mm or less or 0.5 mm or less is easily processed. Thus, the sintered body according to the present embodiment may be a sintered body with a thickness of 0.05 mm or more and 0.3 mm or less or 0.08 mm or more and 0.25 mm or less, for example.

The sintered body according to the present embodiment has a bending strength of more than 1450 MPa, 1455 MPa or more, more than 1550 MPa or 1580 MPa or more. A preferred bending strength may be more than 1450 MPa and 2300 MPa or less, 1500 MPa or more and 2200 MPa or less, preferably 1550 MPa or more and 2150 MPa or less.

It is known that the fracture toughness value of a sintered body with high bending strength is difficult to improve. For example, a sintered body with a bending strength of 1400 MPa or more has a fracture toughness value of less than approximately 7.0 MPa·m$^{0.5}$. In contrast, the sintered body according to the present embodiment is a sintered body with high mechanical strength and a higher fracture toughness value than known sintered bodies. Thus, a preferred sintered body according to the present embodiment may be a sintered body with a bending strength of more than 1450 MPa and a fracture toughness value of 7.0 MPa·m$^{0.5}$ or more, 7.5 MPa·m$^{0.5}$ or more or 8.0 MPa·m$^{0.5}$ or more. The upper limits of the bending strength and fracture toughness value of such a sintered body may be the values described above.

Thus, the sintered body according to the present embodiment is preferably a sintered body that contains zirconia containing a stabilizer, has a monoclinic fraction of 0.5% or more, has a three-point bending strength of more than 1450 MPa as measured by a three-point bending test according to JIS R 1601, and has a fracture toughness value of 7 MPa·m$^{0.5}$ or more and 11 MPa·m$^{0.5}$ or less as measured by a method conforming to the SEPB method specified by JIS R 1607.

The sintered body according to the present embodiment preferably has a bending strength of more than 1450 MPa, 1455 MPa or more, 1490 MPa or more or 1500 MPa or more, and 2300 MPa or less, 2200 MPa or less, 2150 MPa or less, 2100 MPa or less, 2000 MPa or less or 1990 MPa or less and has a fracture toughness value of 6.0 MPa·m$^{0.5}$ or more, 6.5 MPa·m$^{0.5}$ or more, 7.0 MPa·m$^{0.5}$ or more or 7.5 MPa·m$^{0.5}$ or more, and 11 MPa·m$^{0.5}$ or less, 10.5 MPa·m$^{0.5}$ or less, 10 MPa·m$^{0.5}$ or less, 9.5 MPa·m$^{0.5}$ or less or 9.0 MPa·m$^{0.5}$ or less.

The sintered body according to the present embodiment preferably has a total light transmittance of 20% or more and 50% or less, 25% or more and 45% or less or 30% or more and 40% or less. In particular, when the additive component constitutes more than 0% by mass and 25% or less by mass, 0.2% or more by mass and 5% or less by mass or 0.23% or more by mass and 3% or less by mass, the total light transmittance may be 25% or more and 45% or less or 35% or more and 40% or less.

Tetragonal zirconia in the sintered body according to the present embodiment is preferably less likely to be transformed into monoclinic zirconia by hydrothermal treatment (hereinafter also referred to as "hydrothermal degradation"). In the sintered body according to the present embodiment, the ratio of the tetragonal fraction after immersion treatment in hot water at 140° C. for 6 hours to the tetragonal fraction before the immersion treatment in hot water at 140° C. for 6 hours (hereinafter also referred to as the "residual tetragonal fraction" or "ΔT %") is preferably 15% or more, more preferably 70% or more, still more preferably 80% or more. When tetragonal zirconia is not transformed into monoclinic zirconia by the immersion treatment in hot water at 140° C. for 6 hours, the residual tetragonal fraction is 100%. Thus, the sintered body according to the present embodiment may have a residual tetragonal fraction of 100% or less or 95% or less.

A higher additive component content tends to result in less hydrothermal degradation. In the sintered body according to the present embodiment, when the additive component content is 0% by mass, that is, without the additive component, the residual tetragonal fraction may be 15% or more and 100% or less, preferably 20% or more and 100% or less, more preferably 50% or more and 80% or less. When the sintered body according to the present embodiment contains the additive component, and the additive component content is more than 0% by mass and less than 5% by mass, the residual tetragonal fraction may be 65% or more and 100% or less, preferably 70% or more and 90% or less.

When the sintered body according to the present embodiment contains the additive component, and the additive component content is 5% or more by mass and 30% or less by mass, the residual tetragonal fraction may be 70% or more and 100% or less, preferably 76% or more and 95% or less.

The sintered body according to the present embodiment may have any desired shape and may be of a basic shape, such as cubic, rectangular parallelepiped, polyhedral, plate-like, discoidal, columnar, conical or pyramidal, spherical or approximately spherical, or of a shape of a member depending on each application.

A method for producing the sintered body according to the present embodiment may be any method, for example, a method comprising the step of sintering a powder that contains a stabilizer and zirconia with a monoclinic fraction of more than 70% as raw materials and in which monoclinic zirconia has a crystallite size of more than 23 nm and 80 nm or less to form a presintered body with a relative density of 99% or less, and pressure-sintering the presintered body, or a method comprising a presintering step of presintering a green body of a powder that contains a stabilizer and zirconia with a monoclinic fraction of more than 70% and in which monoclinic zirconia has a crystallite size of more than 23 nm and 80 nm or less to form a presintered body with a relative density of 99% or less, and a pressure sintering step of pressure-sintering the presintered body. In the method for producing the sintered body according to the present embodiment, if necessary, a green body or the like may be subjected to at least one of calcination and processing before or after presintering.

A powder to be subjected to presintering is preferably in a formed state, that is, preferably a green body (green compact). The forming may be performed by a known method, for example, at least one selected from the group consisting of uniaxial pressing, cold isostatic pressing, slip casting and injection molding, preferably at least one selected from the group consisting of uniaxial pressing, cold isostatic pressing and injection molding. Thus, a green body, that is, a green compact in which powder particles are physically aggregated is formed.

When a green body is processed before sintering, if necessary, the green body may be calcined to form a calcined body. A calcined body in the present embodiment is composed of fused particles, which are zirconia particles undergoing necking. To form a calcined body composed of fused particles, calcination may be performed by heat-treating a powder, preferably a green body, at a temperature lower than the sintering temperature, for example, by heat-treating a powder, preferably a green body, in air at 800° C. or more and less than 1200° C., preferably 900° C. or more and less than 1150° C., more preferably 900° C. or more and 1100° C. or less or 950° C. or more and less than 1100° C. Thus, a calcined body composed of fused particles is formed. Before the presintering, the calcined body may be processed into any shape.

The sintering may be performed by a known method, for example, at least one selected from the group consisting of pressure sintering, vacuum sintering and pressureless sintering. Pressureless sintering is preferably performed to sinter a powder, preferably a green body. On the other hand, pressure sintering, preferably at least one of hot pressing treatment and HIP treatment, more preferably HIP treatment, is preferably performed to sinter a presintered body.

A presintered body with a relative density of 99% or less, preferably 95% or more and 99% or less, more preferably 97% or more and less than 99% is subjected to pressure sintering. A presintered body may be formed by any firing method, and a green body (or a calcined body) may be subjected to pressureless sintering. In a presintered body with a relative density in such a range, pores of the sintered body are easily removed by pressure sintering. To form a presintered body with a relative density in such a range, the presintering may be pressureless sintering in air at 1100° C. or more and 1400° C. or less, preferably more than 1100° C. and 1400° C. or less, more preferably 1150° C. or more and 1400° C. or less. In the present embodiment, pressureless sintering is a sintering method of heating an object without applying an external force to the object.

In pressure sintering, a presintered body may be treated at a treatment pressure of 50 MPa or more and at a treatment temperature of 1200° C. or more. Preferred pressure sintering may be HIP treatment in a reducing atmosphere or an inert atmosphere at 50 MPa or more and 500 MPa or less and at a treatment temperature of 1200° C. or more and 1550° C. or less for 0.5 to 2 hours. A HIP-treated body is formed by the HIP treatment. The atmosphere may be an atmosphere of at least one of nitrogen and argon or an argon atmosphere.

If necessary, a pressure-treated body, such as a HIP-treated body, may be heat-treated in an oxidizing atmosphere. The heat-treatment conditions may include an air atmosphere, 900° C. or more and 1100° C. or less, and 0.5 hours or more and 5 hours or less.

The sintered body according to the present embodiment may be a HIP-treated body or a HIP-treated body after heat treatment in an oxidizing atmosphere.

The sintered body according to the present embodiment can be used in an application of a known zirconia sintered body as a member containing the sintered body according to the present embodiment. The sintered body according to the present embodiment is suitable for structural materials, such as grinder members, precision machine components and optical connector components; biomaterials, such as dental materials; decorative members; and exterior materials, such as electronic equipment exterior components.

A powder for the sintered body according to the present embodiment is described below.

A powder for the sintered body according to the present embodiment (hereinafter also referred to as a "powder according to the present embodiment") is characterized by containing a stabilizer and zirconia with a monoclinic fraction of more than 70%, wherein monoclinic zirconia has a crystallite size of more than 23 nm and 80 nm or less.

The powder according to the present embodiment contains a stabilizer and zirconia with a monoclinic fraction of more than 70%. That is, the powder according to the present embodiment contains zirconia containing a stabilizer, the zirconia being composed mainly of monoclinic zirconia. It is difficult to produce a sintered body containing tetragonal zirconia by sintering a zirconia powder containing no stabilizer. The tetragonal zirconia provides fracture toughness. The powder according to the present embodiment is a so-called zirconia powder composed mainly of zirconia.

The stabilizer may be at least one selected from the group consisting of calcia (CaO), magnesia (MgO), ceria ($CeO_2$) and yttria ($Y_2O_3$), and is preferably at least one of ceria and yttria, more preferably yttria. When the stabilizer is yttria, the mole ratio of yttria to the total of zirconia ($ZrO_2$) and yttria ($Y_2O_3$) (yttria content) in the powder may be 1.0% or more by mole and 2.5% or less by mole or 1.1% or more by mole and 2.0% or less by mole, preferably 1.2% or more by mole and less than 2.0% by mole, more preferably 1.2% or more by mole and 1.8% or less by mole. In a powder that contains yttria and zirconia with a monoclinic fraction of more than 70% and in which monoclinic zirconia has a crystallite size of more than 23 nm and 80 nm or less, the yttria content is 1.0% or more by mole, 1.1% or more by mole, 1.2% or more by mole or 1.4% or more by mole, and 2.0% or less by mole, less than 2.0% by mole, 1.8% or less by mole or 1.7% or less by mole.

The stabilizer is preferably dissolved in zirconia. The powder according to the present embodiment preferably contains no undissolved stabilizer. An XRD pattern of the powder more preferably contains no XRD peak of the stabilizer.

Monoclinic zirconia, tetragonal zirconia and cubic zirconia are known as main crystalline phases of zirconia. The zirconia in the powder according to the present embodiment contains monoclinic zirconia, preferably monoclinic zirconia and at least one of tetragonal zirconia and cubic zirconia, more preferably monoclinic zirconia and tetragonal zirconia.

The zirconia has a monoclinic fraction of more than 70%, preferably 80% or more, more preferably 85% or more. The monoclinic fraction is 100% or less. When the zirconia contains at least one of tetragonal zirconia and cubic zirconia, the monoclinic fraction is less than 100%. The tetragonal fraction is 30% or less or less than 20%, preferably less than 15%, and may be 10% or less or 7% or less. When the zirconia contains no tetragonal zirconia, the tetragonal fraction is 0%. The tetragonal fraction may be 0% or more.

The monoclinic zirconia has a crystallite size ($D_m$) Of more than 23 nm and 80 nm or less, preferably 30 nm or more and 60 nm or less, more preferably 35 nm or more and 55 nm or less. In another embodiment, the monoclinic zirconia may have a crystallite size ($D_m$) of 30 nm or more and 50 nm or less, 35 nm or more and 50 nm or less, 35 nm or more and 45 nm or less or 36 nm or more and 40 nm or less.

The powder according to the present embodiment may contain at least one additive component selected from the group consisting of alumina ($Al_2O_3$), germania ($GeO_2$) and silica ($SiO_2$). The additive component is preferably at least one of alumina and germania, more preferably alumina. Even at a low stabilizer content of the zirconia, the additive component reduces defects, such as a fracture, while sintering and reduces a decrease in yield while sintering. The additive component content, which is the ratio of the mass of the additive component to the total mass of the stabilizer, such as zirconia or yttria, and the additive component of the powder, may be 0.05% or more by mass and 30% or less by mass, preferably more than 0.1% by mass and 25% or less by mass, more preferably 0.2% or more by mass and 20% or less by mass, still more preferably 0.23% or more by mass and 6% or less by mass.

The powder according to the present embodiment is preferably free of impurities. For example, the phosphorus (P) content may be 0.1% or less by mass and less than 0.1% by mass. However, incidental impurities of zirconia, such as hafnia ($HfO_2$), may be contained.

The powder according to the present embodiment may have a BET specific surface area of 6 m²/g or more and less than 20 m²/g. At a BET specific surface area of 6 m²/g or more, sintering can easily proceed at a relatively low temperature. At less than 20 m²/g, physical aggregation of the powder tends to be reduced. To more easily produce these effects, the BET specific surface area is preferably 8 m²/g or more and 18 m²/g or less, more preferably 10 m²/g or more and 17 m²/g or less, still more preferably 10 m²/g or more and 15 m²/g or less, still more preferably more than 10 m²/g and 15 m²/g or less. On the other hand, to facilitate sintering in a lower temperature range, the BET specific surface area is preferably 14 m²/g or more or 16 m²/g or more and 18 m²/g or less.

The powder according to the present embodiment preferably has a median size of 0.05 μm or more and 0.3 μm or less, preferably 0.1 μm or more and 0.2 μm or less.

The powder according to the present embodiment may have a multimodal volumetric particle size distribution curve, and the volumetric particle size distribution curve preferably has a peak at least at a particle size of 0.05 μm or more and 0.2 μm or less and at a particle size of more than 0.2 μm and 0.5 μm or less, or a peak (extreme value) at a particle size of 0.05 μm or more and 0.2 μm or less and at a particle size of 0.3 μm or more and 0.5 μm or less. A powder with a multimodal volumetric particle size distribution curve, such as a bimodal distribution, tends to have good filling characteristics when formed. The resulting green body tends to have a high density, and the ratio of a peak with a particle size of 0.3 μm or more and 0.5 μm or less to a peak with a particle size of 0.05 μm or more and 0.2 μm or less in the volumetric particle size distribution curve (hereinafter also referred to as the "particle size peak ratio") is preferably more than 0 and less than 1, more preferably 0.1 or more and 0.9 or less, still more preferably 0.2 or more and 0.8 or less.

The powder according to the present embodiment preferably has high formability. When the powder according to the present embodiment is subjected to uniaxial pressing at a pressure of 70±5 MPa and then to cold isostatic pressing (hereinafter also referred to as "CIP") at a pressure of 196±5 MPa to form a green body, the green body preferably has a relative density (hereinafter also referred to as a "green body density") of 49% or more and 56% or less, more preferably 50% or more and 54% or less.

The powder according to the present embodiment may contain a resin or the like for improving flowability or may be a composition containing the powder according to the present embodiment and a resin (hereinafter also referred to as a "compound"). The resin in the compound may be any known resin used in ceramic compositions and is a thermoplastic resin, for example. A preferred resin may be at least one selected from the group consisting of acrylic resins, polystyrenes and polyalkyl carbonates, preferably an acrylic resin.

The powder content of the compound may be 50% or more by mass and 97% or less by mass, 70% or more by mass and 95% or less by mass or 80% or more by mass and 90% or less by mass, as the mass ratio of the powder to the compound. The powder content of the compound may be determined from the ratio of the mass of the compound after the resin is removed to the mass of the compound. The resin may be removed by any method, for example, by heat treatment in air at 200° C. or more and 500° C. or less.

The compound may contain a component, such as wax, as an additive agent, in addition to the resin. These components produce additional effects, such as improved releasability from a forming die. The component, such as wax, may be at least one selected from the group consisting of polyethylene, polypropylene, polyacrylonitrile, acrylonitrile-styrene copolymers, ethylene-vinyl acetate copolymers, styrene-butadiene copolymers, polyacetal resins, petroleum waxes, synthetic waxes, plant waxes, stearic acid, phthalate plasticizers and adipates.

The powder according to the present embodiment can be used as a precursor for calcined bodies and sintered bodies and is suitable for raw powders of structural materials, such as grinder members, precision machine components and optical connector components; biomaterials, such as dental materials; decorative members; and exterior materials, such as electronic equipment exterior components.

To form a sintered body or the like from the powder according to the present embodiment, the powder may be formed and then calcined or sintered by a known method.

A green body of the powder according to the present embodiment is formed by a known method, for example, at least one selected from the group consisting of uniaxial pressing, cold isostatic pressing, slip casting and injection molding. When a green body is formed using a resin, for example, from a compound, the green body may be heat-treated to remove the resin, if necessary. The heat-treatment conditions may be 400° C. or more and less than 800° C. in air.

The green body may be calcined, if necessary. The calcination may be performed by heat treatment at a temperature lower than the sintering temperature of the powder, for example, by heat treatment in air at 800° C. or more and less than 1200° C., preferably 900° C. or more and less than 1150° C., more preferably 900° C. or more and 1100° C. or less or 950° C. or more and less than 1100° C. Thus, powder particles are initially sintered into fused particles undergoing necking and form a calcined body.

The sintering may be performed by a known method, for example, at least one selected from the group consisting of pressure sintering, vacuum sintering and pressureless sintering and preferably includes at least pressure sintering. For pressure sintering, for example, the zirconia powder is molded, is calcined as required, and is presintered in air at 1100° C. or more and 1400° C. or less, preferably more than 1100° C. and 1400° C. or less, more preferably 1150° C. or more and 1400° C. or less. The presintered body is subjected to HIP treatment in an argon atmosphere at 50 MPa or more and 500 MPa or less and at a treatment temperature of 1200° C. or more and 1550° C. or less for 0.5 to 2 hours. In general, in pressure sintering, closed pores of the sintered body can be forcibly removed. Thus, pressure-sintering a sintered body formed by pressureless sintering (a pressureless-sintered body) tends to increase the density and improve the mechanical strength of the sintered body. However, pressure sintering the pressureless-sintered body does not significantly change the fracture toughness value of the sintered body. In contrast, pressure sintering, preferably HIP treatment, of the powder according to the present embodiment serving as a starting material can form a sintered body with a higher fracture toughness value of 7.0 MPa·m$^{0.5}$ or more or more than 7.0 MPa·m$^{0.5}$ and with a bending strength of 1400 MPa or more, 1450 MPa or more or more than 1450 MPa.

Next, a method for producing the powder according to the present embodiment is described.

The powder according to the present embodiment with the above features can be produced by any method. A preferred method for producing the powder according to the present embodiment includes the step of heat-treating a composition containing a zirconia sol and a stabilizer source at 950° C. or more and 1250° C. or less to form a calcined powder, the zirconia sol having an average sol particle size of 150 nm or more and 400 nm or less and containing zirconia containing monoclinic zirconia, and the step of grinding the calcined powder.

A calcined powder serving as a precursor of the powder according to the present embodiment is produced through the step of heat-treating a composition containing a zirconia sol and a stabilizer source at 950° C. or more and 1250° C. or less to form the calcined powder (hereinafter also referred to as a "powder calcination step"), the zirconia sol having an average sol particle size in the range of 150 nm or more and 400 nm or less and containing zirconia containing monoclinic zirconia.

The powder calcination step includes heat treatment at 950° C. or more and 1250° C. or less or 1000° C. or more and 1250° C. or less. The heat treatment at 950° C. or more forms a powder that is easily densified by pressureless sintering. The heat treatment at 1250° C. or less can easily form a powder that is easily dispersed by grinding. The heat-treatment time depends on the heat-treatment temperature and may be 30 minutes or more and 2 hours or less.

The heat treatment may be performed in any atmosphere, for example, one selected from the group consisting of an oxidizing atmosphere, a reducing atmosphere, an inert atmosphere and a vacuum atmosphere, preferably an oxidizing atmosphere, more preferably the air atmosphere.

The zirconia sol has an average sol particle size of 150 nm or more and 400 nm or less, preferably 180 or more and 400 nm or less, more preferably 185 or more and 300 nm or less. The average sol particle size may be 150 nm or more and 270 nm or less, 150 nm or more and 200 nm or less, 190 or more and 400 nm or less or 200 nm or more and 300 nm or less.

The zirconia sol contains zirconia containing monoclinic zirconia and is preferably a zirconia sol containing zirconia composed of crystalline zirconia (hereinafter also referred to as a "crystalline zirconia sol"), more preferably a zirconia sol containing crystalline zirconia containing monoclinic zirconia as a main phase.

The zirconia sol tends to be easily ground. Thus, the zirconium element content (hereinafter also referred to as the "adsorbed zirconium content") of the zirconia sol determined by the following formula is preferably 0% or more by mass and 1% or less by mass, more preferably 0% or more by mass and 0.5% or less by mass, still more preferably 0% or more by mass and 0.01% or less by mass.

$$W_{Zr}=(m/m_o)\times100$$

In this formula, $W_{Zr}$ denotes the adsorbed zirconium content (% by mass). m denotes the mass (mg) of zirconium in terms of zirconia ($ZrO_2$) in a filtrate obtained by ultrafiltration of a slurry containing the zirconia sol dispersed in pure water using an ultrafiltration membrane with a molecular weight cut-off of 500 or more and 3,000,000 or less. The zirconium content of the filtrate may be measured by ICP analysis. $m_o$ denotes the mass (mg) of the zirconia sol heat-treated in air at 1000° C. for 1 hour before ultrafiltration. m and $m_o$ may be measured after the same amount of zirconia sol before ultrafiltration is prepared.

The zirconia sol for the powder calcination step only needs to have the above features and may be produced by any method. The zirconia sol may be produced by at least one of a hydrothermal synthesis method and a hydrolysis method. In the hydrothermal synthesis method, a coprecipitate prepared by mixing a zirconium salt, an alkali and the like in the presence of a solvent is heat-treated at 100° C. or more and 200° C. or less to prepare the zirconia sol. In the hydrolysis method, a zirconium salt is heated in the presence of a solvent to hydrolyze the zirconium salt and prepare the zirconia sol. Thus, the zirconia sol may be a zirconia sol prepared by the hydrothermal synthesis method or the hydrolysis method, preferably the hydrolysis method.

A precursor used in a method for producing a zirconia sol may be a zirconium salt. The zirconium salt may be at least one selected from the group consisting of zirconium oxychloride, zirconyl nitrate, zirconium chloride and zirconium sulfate, preferably at least one of zirconyl nitrate and zirconium oxychloride, more preferably zirconium oxychloride.

A hydrolysis method is described below as a preferred method for producing a zirconia sol.

The hydrolysis conditions may be any conditions under which hydrolysis of a zirconium salt proceeds sufficiently. For example, an aqueous zirconium salt is boiled under reflux for 130 hours or more and 200 hours or less. The average sol particle size tends to increase when an aqueous zirconium salt is hydrolyzed at an anion concentration of 0.2 mol/L or more and 0.6 mol/L or less or 0.3 mol/L or more and 0.6 mol/L or less.

The stabilizer source may be at least one of a stabilizer and a compound serving as a precursor thereof, for example, at least one selected from the group consisting of oxides, hydroxides, oxyhydroxides, chlorides, acetates, nitrates and sulfates serving as a precursor of the stabilizer, preferably at least one of chlorides and nitrates. The stabilizer source is preferably at least one of yttria and an yttrium compound serving as a precursor thereof. A preferred stabilizer source (a stabilizer containing yttria or the like is hereinafter also referred to as an "yttria source" or the like) may be at least one selected from the group consisting of yttrium chloride, yttrium nitrate and yttrium oxide or at least one of yttrium chloride and yttrium oxide. When the stabilizer source is an yttria source, the yttria source content of the composition may be 1.0% or more by mole and 2.5% or less by mole or 1.1% or more by mole and 2.0% or less by mole, preferably 1.2% or more by mole and less than 2.0% or less by mole, more preferably 1.2% or more by mole and 1.8% or less by mole, as the mole ratio of the yttria source in terms of $Y_2O_3$ to the total of zirconium (Zr) and yttrium (Y) in terms of $ZrO_2$ and $Y_2O_3$ in the composition.

The composition for the powder calcination step only needs to contain the zirconia sol and a stabilizer source, and all or part of the stabilizer source may be dissolved in the zirconia sol.

For example, at least part of a stabilizer source can be easily dissolved in zirconia, for example, by hydrolysis of a mixture of a zirconium salt and the stabilizer source or by mixing a zirconium salt, the stabilizer source and an alkali to form a coprecipitate.

The composition for the powder calcination step may contain at least one additive component source selected from the group consisting of alumina sources, germania sources and silica sources. The additive component source is preferably at least one of an alumina source and a germania source, preferably an alumina source.

The alumina source is at least one of alumina and an aluminum compound serving as a precursor thereof, for example, at least one selected from the group consisting of alumina, aluminum hydroxide, aluminum nitrate and aluminum chloride, preferably alumina, more preferably at least one of an alumina sol and an alumina powder.

The germania source is at least one of germania and a germanium compound serving as a precursor thereof, for example, at least one selected from the group consisting of germania, germanium hydroxide and germanium chloride, preferably germania, more preferably at least one of a germania sol and a germania powder.

The silica source is at least one of silica and a silicon compound serving as a precursor thereof, for example, at least one selected from the group consisting of silica and tetraethyl orthosilicate, preferably silica, more preferably at least one of a silica powder, a silica sol, fumed silica and precipitated silica.

The additive component source content may be 0.05% or more by mass and 30% or less by mass, preferably more than 0.1% by mass and 25% or less by mass, more preferably 0.2% or more by mass and 20% or less by mass, as the ratio of the total mass of Al, Ge and Si in terms of $Al_2O_3$, $GeO_2$ and $SiO_2$ to the total mass of Zr, Y, Al, Ge and Si in terms of $ZrO_2$, $Y_2O_3$, $Al_2O_3$, $GeO_2$ and $SiO_2$ in the composition.

For example, the alumina source content may be 0.05% or more by mass and 30% or less by mass, preferably more than 0.1% by mass and 25% or less by mass, more preferably 0.2% or more by mass and 20% or less by mass, as the ratio of the mass of the alumina source in terms of $Al_2O_3$ to the total mass of Zr, Y and Al in terms of $ZrO_2$, $Y_2O_3$ and $Al_2O_3$ in the composition.

The germania source content may be 0.05% or more by mass and 30% or less by mass, preferably more than 0.1% by mass and 25% or less by mass, more preferably 0.2% or more by mass and 20% or less by mass, as the ratio of the mass of the germania source in terms of $GeO_2$ to the total mass of Zr, Y and Ge in terms of $ZrO_2$, $Y_2O_3$ and $GeO_2$ in the composition.

The silica source content may be 0.05% or more by mass and 30% or less by mass, preferably more than 0.1% by mass and 25% or less by mass, more preferably 0.2% or more by mass and 20% or less by mass, as the ratio of the mass of the silica source in terms of $SiO_2$ to the total mass of Zr, Y and Si in terms of $ZrO_2$, $Y_2O_3$ and $SiO_2$ in the composition.

Examples of physical properties of a calcined powder include a BET specific surface area of 3 $m^2/g$ or more and 15 $m^2/g$ or less and a monoclinic crystallite size of 20 nm or more and 60 nm or less.

In the step of grinding a calcined powder (hereinafter also referred to as a "grinding step"), the calcined powder is ground. Zirconia with a low stabilizer content tends to have a fracture or chipping while sintering. However, grinding a calcined powder in the present embodiment tends to increase the yield of sintering, and the resulting sintered body tends to be resistant to hydrothermal degradation.

To produce a powder with a desired composition, in the grinding step, a mixed powder of a calcined powder, an alumina source and an additive component source may be ground instead of the calcined powder. The additive component source may be the additive component source described above. When an additive component source is mixed in the grinding step, the additive component source and a calcined powder may be mixed such that the additive component content source is such that the sum of the mass ratio of Al in terms of $Al_2O_3$, the mass ratio of Ge in terms of $GeO_2$ and the mass ratio of Si in terms of $SiO_2$ relative to the total mass of Zr, Y and at least one selected from the group consisting of Al, Ge and Si in terms of $ZrO_2$, $Y_2O_3$, $Al_2O_3$, $GeO_2$ and $SiO_2$ in the mixed powder is 0.05% or more by mass and 30% or less by mass, preferably more than 0.1% by mass and 25% or less by mass, more preferably 0.2% or more by mass and 20% or less by mass.

Any grinding method may be chosen. At least one of wet grinding and dry grinding may be chosen, and wet grinding is preferred. Specific wet grinding may be at least one selected from the group consisting of a ball mill, a vibrating mill and a continuous medium stirring mill and is preferably a ball mill. Under grinding conditions for a ball mill, for example, a calcined powder is mixed with a solvent to prepare a slurry in which the mass ratio of the calcined powder to the slurry is 30% or more by mass and 60% or less by mass, and the slurry is ground for 10 hours or more and 100 hours or less using zirconia balls with a diameter of 1 mm or more and 15 mm or less as a grinding medium.

Wet grinding may be followed by drying by any method to produce a powder. The drying conditions may be 110° C. to 130° C. in air.

To improve the operability of the powder, a method for producing the powder according to the present embodiment may include the step of granulating the powder (hereinafter also referred to as a "granulation step"). Granulation may be performed by any method. For example, a slurry of a mixture of the powder and a solvent is granulated by spraying. The solvent is at least one of water and an alcohol, preferably water. The granulated powder (hereinafter also referred to as "powder granules") has an average granule size of 30 μm or more and 80 μm or less, 40 μm or more and 60 μm or less or 50 μm or more and 60 μm or less and a bulk density of 1.00 g/cm³ or more and 1.40 g/cm³ or less or 1.10 g/cm³ or more and 1.30 g/cm³ or less.

EXAMPLES

The present disclosure is described in the following examples. However, the present disclosure is not limited to these examples.

(Average Sol Particle Size)

The average sol particle size of a zirconia sol was measured with a dynamic light scattering particle size distribution measuring apparatus (apparatus name: UPA-UT151, manufactured by MicrotracBEL Corp.). For pretreatment of a sample, a solution containing hydrated zirconia sol was suspended in pure water and was dispersed for 3 minutes with an ultrasonic homogenizer.

(Monoclinic Fraction, Tetragonal Fraction, $D_t$ and $D_m$ of Powder)

An XRD pattern of a powder sample was measured with a typical X-ray diffractometer (trade name: Ultima IIV, manufactured by Rigaku Corporation). The conditions for XRD measurement are as follows:

Radiation source: CuKα radiation (2=0.15418 nm)
Measurement mode: continuous scanning
Scanning speed: 4 degrees/min
Step width: 0.02 degrees
Measurement range: 2θ=26 to 33 degrees Using the measured XRD pattern and a calculation program "PRO-FIT", the monoclinic fraction, tetragonal fraction, $D_t$ and $D_m$ were determined using the formulae (1), (2), (4) and (5), respectively.

(BET Specific Surface Area)

The BET specific surface area of a powder sample was measured with a typical flow-type automatic specific surface area measuring apparatus (apparatus name: FlowSorb III 2305, manufactured by Shimadzu Corporation) using nitrogen as an adsorption gas by a method according to JIS R 1626-1996. Before the measurement, a powder sample was degassed in air at 250° C. for 30 minutes as pretreatment.

(Measurement of Particle Size Distribution)

The median size was determined by measuring a volumetric particle size distribution curve of a powder sample with a Microtrac particle size distribution analyzer (trade name: MT3000II, manufactured by MicrotracBEL Corp.) in an HRA mode. Before the measurement, a powder sample was suspended in pure water and was dispersed for 10 minutes with an ultrasonic homogenizer as pretreatment.

(Green Body Density)

The mass of a green body sample was measured with a balance, and the volume was determined from dimensions measured with a vernier caliper. The measured density was determined from the mass and the volume. The theoretical density was determined using the formulae (6) to (9), and the relative density (%) was determined from the measured density (ρ) relative to the theoretical density ($ρ_0$) as a green body density.

(Monoclinic Fraction and Monoclinic Intensity Ratio of Sintered Body)

An XRD of a sintered body sample was measured under the XRD measurement conditions of the powder sample. Using the measured XRD pattern and a calculation program "PRO-FIT", the monoclinic fraction and monoclinic intensity ratio were determined using the formulae (1) and (3), respectively.

For XRD measurement, a sintered body sample with a surface roughness (Ra) of 0.04 μm or less was used after the surface of the sintered body sample was scraped with a surface grinding machine and was then mirror-polished in the following order: automatic polishing with waterproof abrasive paper (#800), automatic polishing with diamond slurry with an average particle size of 3 μm and automatic polishing with 0.03-μm colloidal silica. For the automatic polishing, an automatic polishing apparatus (apparatus name: MECATECH 334, manufactured by PRESI) was used.

(Sintered Body Density)

The measured density of a sintered body sample was determined by Archimedes' principle. Before the measurement, the mass of the sintered body after drying was measured, and then the sintered body was boiled in water for one hour as pretreatment. The theoretical density was determined using the formulae (6) to (9), and the relative density (%) was determined from the measured density (p) relative to the theoretical density (po) as a sintered body density.

(Average Grain Size)

The average grain size was determined by a planimetric method using a SEM view of a sintered body sample obtained by field-emission scanning electron microscope observation. More specifically, a circle with a known area was drawn on the SEM view, and the number of crystal grains (Nc) in the circle and the number of crystal grains (Ni) on the circumference of the circle were counted.

When the total number of crystal grains (Nc+Ni) was 250±50, the average grain size was determined using the following formula.

$$\text{Average grain size} = (Nc + (\tfrac{1}{2}) \times Ni)/(A/M^2)$$

In this formula, Nc denotes the number of crystal grains in the circle, Ni denotes the number of crystal grains on the circumference of the circle, A denotes the area of the circle, and M denotes the magnification (5000 times) of the scanning electron microscope observation. When the number of crystal grains (Nc+Ni) in a SEM view is less than 200, a plurality of SEM views were used to satisfy (Nc+Ni) of 250±50.

Before the measurement, a sintered body sample was mirror-polished and then thermally etched as pretreatment. In the mirror polishing, the surface of the sintered body was scraped with a surface grinding machine and was then polished with a mirror polishing apparatus using diamond abrasive grains with an average grain size of 9 μm, 6 μm and 1 μm in this order.

(Shift Value)

The shift value of the tetragonal zirconia (113) plane was measured with a surface powder X-ray diffractometer (apparatus name: Auto MATE, manufactured by Rigaku Corporation) using CrKβ radiation as a radiation source under the following conditions.

Radiation source: CrKα radiation (λ=2.29100 nm)

Accelerating voltage: 30 kV

Electric current: 30 mA

Measurement method: iso-inclination method

Collimator size: 4 mm in diameter

Measurement lattice plane: tetragonal zirconia (113) plane

Tilt angle ψ: 0 degrees and 45 degrees

A shift value was determined from the values of $2\theta_{(0\ degrees)}$ and $2\theta_{(45\ degrees)}$.

(Fracture Toughness Value)

The fracture toughness value of a sintered body sample was measured by a method conforming to the SEPB method specified in JIS R 1607. Measurement was performed at a span of 30 mm using a columnar sintered body sample 4 mm in width and 3 mm in thickness, and 10 measurements were averaged as a fracture toughness value.

(Bending Strength)

The bending strength of a sintered body sample was measured in a three-point bending test according to JIS R 1601. Measurement was performed at a span of 30 mm using a columnar sintered body sample 4 mm in width and 3 mm in thickness. The bending strength was determined by averaging 10 measurements.

(Total Light Transmittance)

Total light transmittance was measured with a spectrophotometer (apparatus name: V-650, manufactured by JASCO Corporation) by a method according to JIS K 7361. A disk-shaped sample was used for the measurement. Before the measurement, both surfaces of the sample were polished to a sample thickness of 1 mm and a surface roughness (Ra) of 0.02 µm or less. Light in the wavelength range of 220 to 850 nm was passed through the sample and was focused with an integrating sphere to measure transmittance at each wavelength. Transmittance at a wavelength of 600 nm was taken as total light transmittance.

The total light transmittance was measured under the following conditions.

Bandwidth: 5.0 nm

Data acquisition interval: 0.5 nm

Scanning speed: 1000 nm/min

Synthesis Example 1

An aqueous zirconium oxychloride with a zirconium concentration and a chloride ion concentration of 0.4 mol/L was hydrolyzed. The aqueous solution after the hydrolysis was ultrafiltered through an ultrafiltration membrane (molecular weight cut-off: 6000) to prepare a zirconia sol with an average sol particle size of 250 nm. The $W_{Zr}$ of the zirconia sol was below the detection limit (0.01% or less by mass).

Yttrium chloride hexahydrate and aqueous ammonia were added to the aqueous zirconia sol after the ultrafiltration at an yttria content of 1.6% by mole to form a precipitate. The precipitate was washed with pure water, was dried in air, and was then calcined in air at a calcination temperature of 1025° C. for 2 hours to prepare a calcined powder. The calcined powder had a BET specific surface area of 12.5 m²/g and a monoclinic crystallite size of 35 nm.

The calcined powder was mixed with pure water to prepare a slurry. The slurry was ball-milled with zirconia balls and was dried in air at 120° C. to prepare a powder composed of yttria-containing zirconia with an yttria content of 1.6% by mole, which was used as a powder of the present synthesis example. The powder of the present synthesis example contained yttria entirely dissolved in zirconia and had crystalline phases of monoclinic zirconia and tetragonal zirconia. Furthermore, the median size was 0.15 µm, the volumetric particle size distribution curve had bimodal distribution with peaks at a particle size of 0.14 µm and a particle size of 0.33 µm, and the particle size peak ratio was 0.39.

Synthesis Example 2

A powder containing 0.25% by mass of alumina in terms of $Al_2O_3$ and the remainder composed of 1.6% by mole yttria-containing zirconia was prepared in the same manner as in Synthesis Example 1 except that a mixed powder of a calcined powder and 0.25% by mass of an alumina sol in terms of $Al_2O_3$ was ball milled. The powder of the present synthesis example had a median size of 0.15 µm, had a volumetric particle size distribution curve with bimodal distribution with peaks at a particle size of 0.14 µm and a particle size of 0.32 µm, and had a particle size peak ratio of 0.37.

Synthesis Example 3

A powder containing 0.25% by mass of alumina in terms of $Al_2O_3$ and the remainder composed of 1.6% by mole yttria-containing zirconia was prepared in the same manner as in Synthesis Example 1 except that the calcination temperature was 1130° C. and a mixed powder of a calcined powder and 0.25% by mass of an alumina sol in terms of $Al_2O_3$ was ball milled.

The calcined powder had a BET specific surface area of 6.7 m²/g and a monoclinic crystallite size of 44 nm. The powder of the present synthesis example had a median size of 0.18 µm, had a volumetric particle size distribution curve with bimodal distribution with peaks at a particle size of 0.14 µm and a particle size of 0.36 µm, and had a particle size peak ratio of 0.85.

Synthesis Example 4

A powder containing 0.25% by mass of alumina in terms of $Al_2O_3$ and the remainder composed of 2% by mole yttria-containing zirconia was prepared in the same manner as in Synthesis Example 1 except that yttrium chloride hexahydrate was added to the aqueous zirconia sol after ultrafiltration such that yttria constituted 2% by mole and a mixed powder of a calcined powder and 0.25% by mass of an alumina sol in terms of $Al_2O_3$ was ball milled. The powder of the present synthesis example had a median size of 0.15 µm, had a volumetric particle size distribution curve with bimodal distribution with peaks at a particle size of 0.14 µm and a particle size of 0.33 µm, and had a particle size peak ratio of 0.33.

Synthesis Example 5

A powder containing 20% by mass of alumina in terms of $Al_2O_3$ and the remainder composed of 1.6% by mole yttria-containing zirconia was prepared in the same manner as in Synthesis Example 1 except that a mixed powder of a calcined powder and 20% by mass of an alumina powder in terms of $Al_2O_3$ was ball milled. The powder of the present synthesis example had a median size of 0.15 µm, had a volumetric particle size distribution curve with bimodal distribution with peaks at a particle size of 0.14 µm and a particle size of 0.35 μm, and had a particle size peak ratio of 0.41. The tetragonal zirconia had a crystallite size ($D_t$) of 42 nm.

Synthesis Example 6

A powder containing 20% by mass of alumina in terms of $Al_2O_3$ and the remainder composed of 1.6% by mole yttria-containing zirconia was prepared in the same manner as in Synthesis Example 1 except that the calcination temperature was 1130° C. and a mixed powder of a calcined powder and 20% by mass of an alumina powder in terms of $Al_2O_3$ was ball milled. The powder of the present synthesis example had a median size of 0.16 μm, had a volumetric particle size distribution curve with bimodal distribution with peaks at a particle size of 0.14 μm and a particle size of 0.35 μm, and had a particle size peak ratio of 0.67.

Synthesis Example 7

A powder containing 5% by mass of alumina in terms of $Al_2O_3$ and the remainder composed of 2% by mole yttria-containing zirconia was prepared in the same manner as in Synthesis Example 1 except that yttrium chloride hexahydrate was added to the aqueous zirconia sol after ultrafiltration such that yttria constituted 2% by mole and a mixed powder of a calcined powder and 5% by mass of an alumina sol in terms of $Al_2O_3$ was ball milled. The powder of the present synthesis example had a median size of 0.15 μm, had a volumetric particle size distribution curve with bimodal distribution with peaks at a particle size of 0.14 μm and a particle size of 0.35 μm, and had a particle size peak ratio of 0.41.

Synthesis Example 8

A powder containing 0.5% by mass of alumina in terms of $Al_2O_3$ and the remainder composed of 1.6% by mole yttria-containing zirconia was prepared in the same manner as in Synthesis Example 1 except that a mixed powder of a calcined powder and 0.5% by mass of an alumina sol in terms of $Al_2O_3$ was ball milled. The powder of the present synthesis example had a median size of 0.15 μm, had a volumetric particle size distribution curve with bimodal distribution with peaks at a particle size of 0.14 μm and a particle size of 0.32 μm, and had a particle size peak ratio of 0.49.

Synthesis Example 9

A powder containing 1% by mass of alumina in terms of $Al_2O_3$ and the remainder composed of 1.6% by mole yttria-containing zirconia was prepared in the same manner as in Synthesis Example 1 except that a mixed powder of a calcined powder and 1% by mass of an alumina sol in terms of $Al_2O_3$ was ball milled. The powder of the present synthesis example had a median size of 0.15 μm, had a volumetric particle size distribution curve with bimodal distribution with peaks at a particle size of 0.14 μm and a particle size of 0.34 μm, and had a particle size peak ratio of 0.49.

Synthesis Example 10

A powder containing 0.25% by mass of germanium oxide in terms of $GeO_2$ and the remainder composed of 1.6% by mole yttria-containing zirconia was prepared in the same manner as in Synthesis Example 1 except that a mixed powder of a calcined powder and 0.25% by mass of germanium oxide in terms of $GeO_2$ was ball milled. The powder of the present synthesis example had a median size of 0.14 μm, had a volumetric particle size distribution curve with bimodal distribution with peaks at a particle size of 0.14 μm and a particle size of 0.34 μm, and had a particle size peak ratio of 0.37.

Synthesis Example 11

A powder containing 0.25% by mass of silica in terms of $SiO_2$ and the remainder composed of 1.6% by mole yttria-containing zirconia was prepared in the same manner as in Synthesis Example 1 except that a mixed powder of a calcined powder and 0.25% by mass of a silica sol in terms of $SiO_2$ was ball milled. The powder of the present synthesis example had a median size of 0.18 μm, had a volumetric particle size distribution curve with bimodal distribution with peaks at a particle size of 0.14 μm and a particle size of 0.35 μm, and had a particle size peak ratio of 0.89.

Synthesis Example 12

A powder containing 0.25% by mass of alumina in terms of $Al_2O_3$, 0.25% by mass of germanium oxide in terms of $GeO_2$ and the remainder composed of 1.6% by mole yttria-containing zirconia was prepared in the same manner as in Synthesis Example 1 except that a mixed powder of a calcined powder, 0.25% by mass of an alumina sol in terms of $Al_2O_3$ and 0.25% by mass of germanium oxide in terms of $GeO_2$ was ball milled. The powder of the present synthesis example had a median size of 0.15 μm, had a volumetric particle size distribution curve with bimodal distribution with peaks at a particle size of 0.14 μm and a particle size of 0.34 μm, and had a particle size peak ratio of 0.37.

Comparative Synthesis Example 1

An aqueous zirconium oxychloride with a zirconium concentration of 0.37 mol/L and a chloride ion concentration of 0.74 mol/L was hydrolyzed. The aqueous solution after the hydrolysis was ultrafiltered through an ultrafiltration membrane (molecular weight cut-off: 6000) to prepare a zirconia sol with an average sol particle size of 100 nm. The zirconia sol had a $W_{Zr}$ of 9% by mass.

Yttrium chloride hexahydrate and aqueous ammonia were added to the aqueous zirconia sol after the ultrafiltration at an yttria content of 2% by mole to form a precipitate. The precipitate was washed with pure water, was dried in air, and was then calcined in air at a calcination temperature of 1000° C. for 2 hours to prepare a calcined powder.

The calcined powder was mixed with pure water to prepare a slurry. The slurry was ball-milled with zirconia balls and was dried in air at 120° C. to prepare a powder composed of yttria-containing zirconia with an yttria content of 2% by mole, which was used as a powder of the present comparative synthesis example.

Comparative Synthesis Example 2

A powder containing 0.25% by mass of alumina in terms of $Al_2O_3$ and the remainder composed of 2% by mole yttria-containing zirconia was prepared in the same manner as in Comparative Synthesis Example 1 except that a mixed powder of a calcined powder and 0.25% by mass of an alumina powder in terms of $Al_2O_3$ was ball milled.

Comparative Synthesis Example 3

A powder containing 5% by mass of alumina in terms of $Al_2O_3$ and the remainder composed of 2% by mole yttria-containing zirconia was prepared in the same manner as in Comparative Synthesis Example 1 except that a mixed powder of a calcined powder and 5% by mass of an alumina powder in terms of $Al_2O_3$ was ball milled.

Comparative Synthesis Example 4

A powder of 0.9% by mole yttria-containing zirconia was prepared in the same manner as in Synthesis Example 1 except that a precipitate was formed by adding yttrium chloride hexahydrate and aqueous ammonia to the aqueous zirconia sol after ultrafiltration such that yttria constituted 0.9 by mole.

The following table shows the evaluation results of the powders of these synthesis examples and comparative synthesis examples.

TABLE 1

| | $Y_2O_3$ % by mole | $Al_2O_3$ % by weight | $GeO_2$ % by weight | $SiO_2$ % by weight | $D_m$ nm | Monoclinic fraction % | Tetragonal fraction % | BET specific surface area $m^2/g$ |
|---|---|---|---|---|---|---|---|---|
| Synthesis Example 1 | 1.6 | 0 | 0 | 0 | 37 | 94 | 6 | 15.9 |
| Synthesis Example 2 | 1.6 | 0.25 | 0 | 0 | 37 | 94 | 6 | 15.1 |
| Synthesis Example 3 | 1.6 | 0.25 | 0 | 0 | 48 | 100 | 0 | 10.3 |
| Synthesis Example 4 | 2.0 | 0.25 | 0 | 0 | 36 | 91 | 9 | 17.7 |
| Synthesis Example 5 | 1.6 | 20 | 0 | 0 | 40 | 93 | 7 | 16.8 |
| Synthesis Example 6 | 1.6 | 20 | 0 | 0 | 48 | 100 | 0 | 11.6 |
| Synthesis Example 7 | 2.0 | 5 | 0 | 0 | 39 | 88 | 12 | 17.6 |
| Synthesis Example 8 | 1.6 | 0.5 | 0 | 0 | 36 | 95 | 5 | 16.8 |
| Synthesis Example 9 | 1.6 | 1 | 0 | 0 | 36 | 95 | 5 | 17.9 |
| Synthesis Example 10 | 1.6 | 0 | 0.25 | 0 | 36 | 95 | 5 | 16.2 |
| Synthesis Example 11 | 1.6 | 0 | 0 | 0.25 | 37 | 92 | 8 | 14.8 |
| Synthesis Example 12 | 1.6 | 0.25 | 0.25 | 0 | 37 | 95 | 5 | 16.8 |
| Comparative Synthesis Example 1 | 2.0 | 0 | 0 | 0 | 16 | 64 | 36 | 17.0 |
| Comparative Synthesis Example 2 | 2.0 | 0.25 | 0 | 0 | 16 | 64 | 36 | 16.8 |
| Comparative Synthesis Example 3 | 2.0 | 5 | 0 | 0 | 16 | 65 | 35 | 16.5 |
| Comparative Synthesis Example 4 | 0.9 | 0 | 0 | 0 | 23 | 100 | 0 | 15.8 |

The table shows that the powders of the synthesis examples and Comparative Synthesis Examples 1 to 3 had almost the same stabilizer contents (yttria contents) and additive agent contents, but Comparative Synthesis Examples 1 to 3 had a smaller $D_m$ and a lower monoclinic fraction than the synthesis examples. Furthermore, Comparative Synthesis Example 4 had a smaller $D_m$ than the synthesis examples.

Example 1

The powder of Synthesis Example 4 was subjected to die pressing at a pressure of 70 MPa and CIP treatment at a pressure of 196 MPa to form a green body. The green body was subjected to pressureless sintering in air at a sintering temperature of 1200° C. for 2 hours to prepare a presintered body. The presintered body was subjected to HIP treatment in an argon atmosphere at a treatment pressure of 150 MPa and at a treatment temperature of 1500° C. for 1 hour to prepare a HIP-treated body, which was then fired in air at 1000° C. for 1 hour to prepare a sintered body (HIP-treated body) of the present example.

Example 2

A green body and a sintered body were prepared in the same manner as in Example 1 except that the powder of Synthesis Example 5 was used, the sintering temperature of the presintering was 1350° C., and the HIP treatment temperature was 1500° C.

Example 3

A green body and a sintered body were prepared in the same manner as in Example 1 except that the powder of Synthesis Example 6 was used, the sintering temperature of the presintering was 1350° C., and the HIP treatment temperature was 1500° C.

Example 4

A green body and a sintered body were prepared in the same manner as in Example 1 except that the powder of Synthesis Example 7 was used and the HIP treatment temperature was 1500° C.

Example 5

A green body and a sintered body were prepared in the same manner as in Example 1 except that the powder of Synthesis Example 8 was used, the sintering temperature of the presintering was 1175° C., and the HIP treatment temperature was 1250° C.

Example 6

A green body and a sintered body were prepared in the same manner as in Example 1 except that the powder of Synthesis Example 9 was used, the sintering temperature of the presintering was 1175° C., and the HIP treatment temperature was 1250° C.

Example 7

A green body and a sintered body were prepared in the same manner as in Example 1 except that the powder of Synthesis Example 9 was used, the sintering temperature of the presintering was 1175° C., and the HIP treatment temperature was 1350° C.

Example 8

A green body and a sintered body were prepared in the same manner as in Example 1 except that the powder of Synthesis Example 10 was used, the sintering temperature of the presintering was 1200° C., and the HIP treatment temperature was 1250° C.

Example 9

A green body and a sintered body were prepared in the same manner as in Example 1 except that the powder of Synthesis Example 12 was used, the sintering temperature of the presintering was 1175° C., and the HIP treatment temperature was 1250° C.

Example 10

A green body and a sintered body were prepared in the same manner as in Example 1 except that the powder of Synthesis Example 2 was used and the HIP treatment temperature was 1350° C.

The following table shows the evaluation results of the sintered bodies according to the examples together with the relative densities of the presintered bodies.

prepared had a fracture toughness value of 7.0 MPa·m$^{0.5}$ or more and a bending strength of 1460 MPa, and a sintered body thus prepared had a fracture toughness value of 8.0 MPa·m$^{0.5}$ or more and a bending strength of 1550 MPa.

Measurement Example 1 (Total Light Transmittance)

The total light transmittance of each sintered body of the examples was measured. The main results are shown in the following table.

TABLE 3

| | HIP treatment temperature (° C.) | Al$_2$O$_3$ (% by weight) | GeO$_2$ (% by weight) | Total light transmittance (%) |
|---|---|---|---|---|
| Example 1 | 1500 | 0.25 | 0 | 36 |
| Example 5 | 1250 | 0.5 | 0 | 32 |
| Example 6 | 1250 | 1 | 0 | 27 |
| Example 7 | 1350 | 1 | 0 | 27 |
| Example 8 | 1250 | 0 | 0.25 | 37 |
| Example 9 | 1250 | 0.25 | 0.25 | 35 |
| Example 10 | 1350 | 0.25 | 0 | 37 |

The table shows that the total light transmittance tends to decrease with an increase in the amount of additives. The table also shows that the total light transmittance at an additive content of 0.25% or more by mass and 1.0% or less by mass is 25% or more, 30% or more or 35% or more.

TABLE 2

| | Presintered body Density % | Sintered body | | | | | |
|---|---|---|---|---|---|---|---|
| | | Density % | Average crystal grain size μm | Monoclinic fraction % | Monoclinic crystal intensity ratio | Fracture toughness value MPa · m$^{0.5}$ | Bending strength MPa |
| Example 1 | 97.8 | 99.9 | 0.55 | 0.7 | 0 | 6.5 | 1910 |
| Example 2 | 97.8 | 100 | 0.51 | 7.8 | 0.52 | 7.6 | 1980 |
| Example 3 | 97.0 | 99.9 | 0.51 | 7.0 | 0.46 | 7.2 | 2010 |
| Example 4 | 97.0 | 99.8 | 0.50 | 0.9 | 0 | 6.0 | 2140 |
| Example 5 | 97.6 | 99.8 | 0.25 | 2.8 | 0.07 | 8.2 | 1600 |
| Example 6 | 97.9 | 99.8 | 0.24 | 6.9 | 0.40 | 8.7 | 1560 |
| Example 7 | 98.1 | 99.8 | 0.33 | 7.9 | 0.75 | 10.3 | 1510 |
| Example 8 | 98.7 | 100 | 0.25 | 3.1 | 0.09 | 7.3 | 1470 |
| Example 9 | 98.7 | 100 | 0.26 | 5.7 | 0.32 | 8.1 | 1570 |
| Example 10 | 97.9 | 99.7 | 0.28 | 8.2 | 1.1 | 9.8 | 1460 |

The table shows that a sintered body (HIP-treated body) with a bending strength of more than 1450 MPa and a fracture toughness value of 6.0 MPa·m$^{0.5}$ or more was formed. The table also shows that a sintered body thus

Measurement Example 2 (Shift Value)

The shift value of the sintered body of Example 10 was measured. For comparison purposes, a shift value of a sintered body (comparative sintered body) formed by pres-intering a commercial 2% by mole yttria-containing zirconia powder (product name: TZ-2Y, manufactured by Tosoh Corporation) at a sintering temperature of 1450° C. followed by HIP treatment at a treatment temperature of 1500° C. was also measured. The results are shown in the following table.

TABLE 4

| | $2\theta_{(0\ degrees)}$ [degree] | $2\theta_{(45\ degrees)}$ [degree] | Shift value [degree] | Fracture toughness value $[MPa \cdot m^{0.5}]$ |
|---|---|---|---|---|
| Example 10 | 152.28 | 152.88 | 0.60 | 9.8 |
| Comparative sintered body | 152.74 | 152.86 | 0.12 | 5.4 |

The sintered body according to Example 10 has a higher shift value and a higher fracture toughness value than the comparative sintered body prepared by the HIP treatment of the commercial powder.

Measurement Example 3 (Evaluation of Processability)

The sintered bodies of the examples were processed to a sample thickness of 0.09 mm. The samples with a sample thickness of 0.09 mm were prepared without cracking.

In a comparative measurement example, the powder of Comparative Synthesis Example 1 was subjected to die pressing at a pressure of 70 MPa and CIP treatment at a pressure of 196 MPa. The green body thus prepared was subjected to pressureless sintering in air at a sintering temperature of 1450° C. for 2 hours to prepare a sintered body. When the sintered body was processed in the same manner, the sintered body was cracked and could not be processed to a smaller thickness. The cracked piece of the sintered body had a thickness of approximately 0.3 mm.

Measurement Example 4 (Evaluation of Compounds)

The powders of Synthesis Examples 2 and 3 were used to prepare compounds. More specifically, each of the powders was dried at 150° C. for 1 hour or more, and then the powder and an acrylic resin were kneaded at 160° C. in a kneader (apparatus name: Labo kneader mill TDR-3, manufactured by Toshin Co., Ltd.) to prepare a compound such that the powder constituted 85% by mass of the compound. After 15 minutes from the start of kneading, the torque (N·m) applied to the kneader was measured to evaluate the kneading property of the compound. A smaller torque indicates a compound that can be more easily kneaded, that is, a compound with a better kneading property.

Flowability was evaluated by measuring the flow rate of the compound sample with a flow tester. A typical flow tester (apparatus name: Flow tester CFT500D, manufactured by Shimadzu Corporation) was used for the measurement, and the syringe was filled with the compound. The flowability was evaluated by applying a load to the compound under the following conditions and measuring the volume velocity (cm³/s) of the compound ejected from the syringe. The measurement conditions are described below. A higher volume velocity indicates a compound that flows more easily in the molten state, that is, a compound with higher flowability.

Syringe area: 1 cm²
Die hole size: 1 mm in diameter

Dir length: 2 mm
Load: 50 kg
Measurement temperature: 160° C.
Compound density: 3.0 g/cm³

In a comparative measurement example, a 3% by mole yttria-containing zirconia powder with a BET specific surface area of 15.0 m²/g and an average particle size (median size) of 1.1 μm was evaluated in the same manner. The evaluation results of the compounds are shown in the following table. The powder of the comparative measurement example had a poor kneading property and could not be kneaded at 160° C. Thus, the kneading property of the comparative measurement example in the following table is the kneading property at 170° C.

TABLE 5

| | BET specific surface area $(m^2/g)$ | Torque $(N \cdot m)$ | Volume velocity $(cm^3/s)$ |
|---|---|---|---|
| Synthesis Example 2 | 15.1 | 14 | 0.15 |
| Synthesis Example 3 | 10.3 | 8 | 0.35 |
| Comparative measurement example | 15.0 | 16 | 0.03 |

The powder of Synthesis Example 3 with a lower BET specific surface area than the powder of the comparative measurement example had a better kneading property and higher flowability, particularly much higher flowability. Furthermore, although the powders of Synthesis Example 2 and the comparative measurement example had almost the same BET specific surface areas, the powder of Synthesis Example 2 had much higher flowability than the comparative measurement example. These results show that the powders of the synthesis examples also have advantages as compositions (compounds) composed of the powder and the resin.

The entire contents of the description, claims and abstract of Japanese Patent Application No. 2020-075780 filed on Apr. 22, 2020 and Japanese Patent Application No. 2020-178571 filed on Oct. 26, 2020 are hereby incorporated by reference as the disclosure of the description of the present disclosure.

The invention claimed is:

1. A sintered body comprising zirconia containing a stabilizer, wherein the sintered body has a monoclinic fraction of 0.5% or more and has a three-point bending strength of more than 1450 MPa as measured by a three-point bending test according to JIS R 1601, and a shift value, defined as a difference between a 2θ value of a peak appearing at 2θ=152±2.0 degrees with a tilt angle φ=0 degrees and a 2θ value of a peak appearing at 2θ=152±2.0 degrees with a tilt angle φ=45°, of 0.15 degrees or more, and wherein a stabilizer content is 1.0% or more by mole and less than 2.5% by mole.

2. The sintered body according to claim 1, wherein a total light transmittance of light with a wavelength of 600 nm is 20% or more at a sample thickness of 1.0 mm.

3. The sintered body according to claim 1, wherein a ratio of an integrated intensity of an XRD peak corresponding to a (11-1) plane of monoclinic zirconia to an integrated intensity of an XRD peak corresponding to a (111) plane of the monoclinic zirconia is 0 or more.

4. The sintered body according to claim 1, wherein the stabilizer is at least one selected from the group consisting of yttria, calcia, magnesia and ceria.

5. The sintered body according to claim 1, wherein a stabilizer content is 1.0% or more by mole and less than 1.9% by mole.

6. The sintered body according to claim 1, wherein a fracture toughness value measured by a method conforming to an SEPB method specified in JIS R 1607 is 6 MPa·m$^{0.5}$ or more and 11 MPa·m$^{0.5}$ or less.

7. The sintered body according to claim 1, wherein a tetragonal zirconia (113) plane has a shift value of 0.15 degrees or more and 2.0 degrees or less.

8. The sintered body according to claim 1, comprising at least one additive component selected from the group consisting of alumina, germania and silica.

9. The sintered body according to claim 1, wherein the additive component is alumina.

10. The sintered body according to claim 1, wherein the zirconia contains monoclinic zirconia and at least one of tetragonal zirconia and cubic zirconia.

11. The sintered body according to claim 1, wherein a ratio of a tetragonal fraction after immersion treatment in hot water at 140° C. for 6 hours to a tetragonal fraction before the immersion treatment in hot water at 140° C. for 6 hours is 15% or more.

12. A method for producing the sintered body according to claim 1, comprising sintering a powder that contains a stabilizer and zirconia with a monoclinic fraction of more than 70% and in which monoclinic zirconia has a crystallite size of more than 23 nm and 80 nm or less to form a presintered body with a relative density of 99% or less, and pressure-sintering the presintered body.

13. The production method according to claim 12, wherein the pressure treatment is hot isostatic pressing treatment.

14. A member comprising the sintered body according to claim 1.

15. The sintered body according to claim 1, wherein the stabilizer contains yttria and, the yttria content is 1.0% or more by mole and 2.0% or less by mole.

* * * * *